US012153367B2

(12) United States Patent
Araki

(10) Patent No.: US 12,153,367 B2
(45) Date of Patent: *Nov. 26, 2024

(54) IMAGE FORMING DEVICE

(71) Applicant: TOSHIBA TEC KABUSHIKI KAISHA, Tokyo (JP)

(72) Inventor: Satoshi Araki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,612

(22) Filed: Jul. 6, 2023

(65) Prior Publication Data

US 2023/0341801 A1 Oct. 26, 2023

Related U.S. Application Data

(63) Continuation of application No. 17/869,806, filed on Jul. 21, 2022, now Pat. No. 11,733,632.

(30) Foreign Application Priority Data

Nov. 11, 2021 (JP) ................................ 2021-184156

(51) Int. Cl.
*G03G 15/00* (2006.01)

(52) U.S. Cl.
CPC ..... *G03G 15/5041* (2013.01); *G03G 15/5054* (2013.01)

(58) Field of Classification Search
CPC ........... G03G 15/5016; G03G 15/5041; G03G 15/5054; G03G 15/5058; G03G 15/55
See application file for complete search history.

(56) References Cited

U.S. PATENT DOCUMENTS 5,298,943 A 3/1994 Ide et al.
5,579,090 A 11/1996 Sasanuma et al.
(Continued)

FOREIGN PATENT DOCUMENTS

JP 04-336552 11/1992
JP 2014-10248 1/2014
JP 2019-056789 4/2019

OTHER PUBLICATIONS

Extended European Search Report for European Patent Application No. 22196312.7 dated Apr. 6, 2023.

*Primary Examiner* — Hoang X Ngo
(74) *Attorney, Agent, or Firm* — Amin, Turocy & Watson, LLP

(57) ABSTRACT

To provide an image forming device that can be efficiently maintained. According to one embodiment, the image forming device includes a plurality of photoconductors, an exposure device, a developer, and a processor. The exposure device irradiates a corresponding surface of the plurality of photoconductors with light corresponding to an image formed on a corresponding photoconductor of the plurality of photoconductors. The developer supplies a toner to the corresponding surface of the plurality of photoconductors on which an electrostatic latent image is formed by the light emitted by the exposure device. The processor adjusts, for every photoconductor, a contrast potential for supplying the toner from the developer to the electrostatic latent image formed on the corresponding surface of the plurality of photoconductors, and notifies a warning when there is a contrast potential whose difference from another contrast potential exceeds a reference value.

20 Claims, 4 Drawing Sheets

(56) References Cited

U.S. PATENT DOCUMENTS

| | | | |
|---|---|---|---|
| 2005/0213999 | A1 | 9/2005 | Hirobe |
| 2011/0280594 | A1 | 11/2011 | Tanaka |
| 2012/0207496 | A1 | 8/2012 | Noguchi et al. |

IMAGE FORMING DEVICE

CROSS-REFERENCE TO RELATED APPLICATIONS

This application is a Continuation of application Ser. No. 17/869,806 filed on Jul. 21, 2022, the entire contents of which are incorporated herein by reference.

This application is based upon and claims the benefit of priority from Japanese Patent Application No. 2021-184156, filed on Nov. 11, 2021, the entire contents of which are incorporated herein by reference.

FIELD

Embodiments described herein relate generally to an image forming device, an image forming method, and a contrast control device.

BACKGROUND

In the related art, an image forming device such as a digital multi-functional peripheral is maintained by a service person who visits an installation location. It is desired that such an image forming device be efficiently maintained by being visited by a service person at an appropriate timing.

An electrophotographic image forming device includes a developer containing toners of a plurality of colors (for example, yellow, magenta, cyan, and black) to form a color image. The electrophotographic image forming device adjusts, for a color, a contrast potential for developing an electrostatic latent image with a toner of the corresponding color so as to make a density (toner density) in an image of the corresponding color uniform. In the image forming device, if developers of colors have substantially the same charging properties, differences in contrast potential of colors are rarely increased in a state where a toner density of a color is made uniform. In other words, when the difference in contrast potential is large, in many cases, some kind of malfunction occurs in the electrophotographic image forming device.

However, an image forming device in the related art cannot detect a possibility of a failure or an abnormality based on the differences in contrast potential of colors. Therefore, the image forming device in the related art cannot be facilitated efficient maintenance by notifying the failure or the abnormality suggested by the differences in contrast potential of colors.

DETAILED DESCRIPTION

In general, according to one embodiment, an image forming device that can be efficiently maintained is provided.

According to one embodiment, the image forming device includes a plurality of photoconductors, an exposure device, a developer, and a processor. The exposure device irradiates a corresponding surface of the plurality of photoconductors with light corresponding to an image formed on a corresponding photoconductor of the plurality of photoconductors. The developer supplies a toner to the corresponding surface of the plurality of photoconductors on which an electrostatic latent image is formed by the light emitted by the exposure device. The processor adjusts, for every photoconductor, a contrast potential for supplying the toner from the developer to the electrostatic latent image formed on the corresponding surface of the plurality of photoconductors, and notifies a warning when there is a contrast potential whose difference from another contrast potential exceeds a reference value.

Hereinafter, the present embodiment will be described with reference to the drawings.

First, a configuration of a digital multi-functional peripheral (MFP) 1 as the image forming device according to the embodiment will be described.

Figure 1:
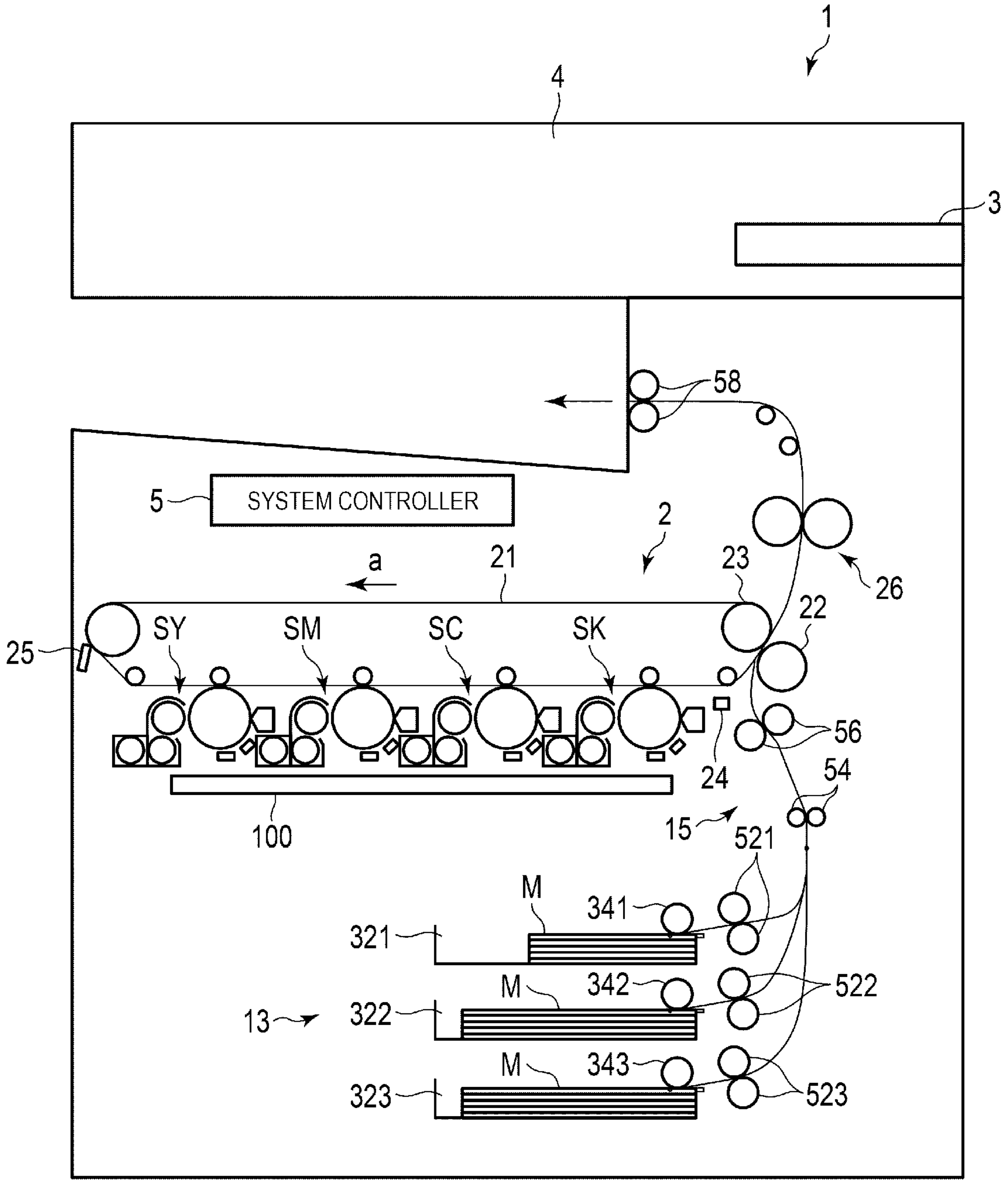
FIG. 1 is a diagram showing a configuration example of a digital multi-functional peripheral as an image forming device according to an embodiment.

FIG. 1 is a block diagram showing a configuration example of the digital multi-functional peripheral 1 as the image forming device according to the embodiment.

As shown in FIG. 1, the digital multi-functional peripheral 1 includes a printer 2, an operation panel 3, a scanner 4, and a system controller 5.

The printer 2 is an image forming device that forms an image on a recording medium. The printer 2 included in the digital multi-functional peripheral 1 is an image forming device that forms an image on a recording medium by an electrophotographic method. The printer 2 forms an image (toner image) on a recording medium such as paper by using a toner. The recording medium on which the image is formed by the printer 2 may be any material as long as the image can be formed thereon, and is not limited to paper, and may be cloth, a plastic film or a sheet.

The scanner 4 is provided on an upper portion of a main body of the digital multi-functional peripheral 1. The scanner 4 is a device that optically reads an image of a document. For example, the scanner 4 reads an image of a document set on a platen glass. Further, the scanner 4 may be configured to include a scanner that reads an image of a document to be conveyed by an auto document feeder (ADF).

The operation panel 3 is a user interface. The operation panel 3 includes a display unit (display), a touch panel, and an operation button. The operation panel 3 displays an operation guide on the display unit. The operation panel 3 receives an operation instruction from a user by using the touch panel and the operation button. For example, the operation panel 3 is provided with the touch panel on a display screen of the display unit, and detects a portion touched by the user on the display screen of the display unit.

The system controller 5 controls the entire digital multi-functional peripheral 1. The system controller 5 receives the operation instruction input to the operation panel 3 and controls operations of the units. Further, the system controller 5 receives an operation instruction from an external device connected via an interface and controls the operations of the units. For example, when image formation on the recording medium is instructed, the system controller 5 controls the printer 2 to cause the printer 2 to perform the image formation on the recording medium.

Hereinafter, a configuration of the printer 2 will be described.

As shown in FIG. 1, the printer 2 includes a medium supply mechanism 13, a conveyance mechanism 15, a plurality of image forming stations SY, SM, SC, and SK, an intermediate transfer belt 21, a secondary transfer roller 22, a support roller 23, a toner adhesion amount sensor 24, a transfer belt cleaner 25, and a fixing device 26.

The medium supply mechanism 13 includes a plurality of paper feed cassettes 321, 322, and 323. Any number of paper feed cassettes may be used. The paper feed cassettes 321, 322, and 323 separately store paper as a recording medium M. The paper as the recording medium M stored in the paper feed cassette may be designed such that different sizes or different types of paper can be stored. Pickup rollers 341, 342, and 343 are respectively disposed on the paper feed cassettes 321, 322, and 323. The pickup rollers 341, 342, and 343 pick up papers as the recording medium M respectively from the paper feed cassettes 321, 322, and 323 one by one. The pickup rollers 341, 342, and 343 separately supply the corresponding picked-up recording medium M to the conveyance mechanism 15.

The conveyance mechanism 15 conveys the recording medium M. The conveyance mechanism 15 includes first conveyance rollers 521, 522, and 523, a second conveyance roller 54, and a registration roller 56 in a conveyance path before image formation on the recording medium M. The conveyance mechanism 15 conveys the corresponding recording medium M supplied by the pickup rollers 341, 342, and 343 from the first conveyance rollers 521, 522, and 523 to the second conveyance roller 54. In the conveyance mechanism 15, the second conveyance roller 54 further conveys the recording medium M to the registration roller 56.

The registration roller 56 of the conveyance mechanism 15 conveys the recording medium M to a secondary transfer position according to a timing of transferring an image from the intermediate transfer belt 21 to the recording medium M at a secondary transfer position described later. The conveyance mechanism 15 forms a conveyance path so as to convey, to the fixing device 26, the recording medium M on which the image is transferred from the intermediate transfer belt 21. Further, the conveyance mechanism 15 includes a third conveyance roller 58 that discharges the paper to a paper discharge unit, and a conveyance mechanism that conveys the recording medium M to a reversing unit for reversing the recording medium M.

The image forming stations SY, SM, SC, and SK separately form an image with a toner. In the present embodiment, the image forming station SY forms a yellow image. The image forming station SM forms a magenta image. The image forming station SC forms a cyan image. The image forming station SK forms a black image. The image forming stations SY, SM, SC, and SK transfer, to the intermediate transfer belt 21, the images formed with the toners.

The intermediate transfer belt 21 is a medium that holds the images transferred by the image forming stations SY, SM, SC, and SK. The intermediate transfer belt 21 is an endless belt as shown in FIG. 1. The intermediate transfer belt 21 moves in a direction indicated by an arrow a in FIG. 1. The intermediate transfer belt 21 moves the corresponding image transferred by the image forming stations SY, SM, SC, and SK to a position where the secondary transfer roller 22 and the support roller 23 face each other.

The secondary transfer roller 22 and the support roller 23 form a transfer unit (secondary transfer unit) that transfers the image from the intermediate transfer belt 21 to a recording medium. The position where the secondary transfer roller 22 and the support roller 23 face each other is the secondary transfer position where the image is transferred from the intermediate transfer belt 21 to the recording medium. The secondary transfer roller 22 and the support roller 23 sandwich the intermediate transfer belt 21 and the recording medium at the secondary transfer position.

The support roller 23 supports the intermediate transfer belt 21. The support roller 23 is a drive roller that drives the intermediate transfer belt 21. The secondary transfer roller 22 faces the support roller 23 with the intermediate transfer belt 21 interposed therebetween. The secondary transfer roller 22 transfers (secondarily transfers), to a surface of the recording medium, the image formed with a toner on a transfer surface of the intermediate transfer belt 21.

The toner adhesion amount sensor 24 is a sensor that detects a toner amount (density). The toner adhesion amount sensor 24 detects an amount of a toner adhered to the intermediate transfer belt 21. The toner adhesion amount sensor 24 is disposed so as to face the transfer surface of the intermediate transfer belt 21. The toner adhesion amount sensor 24 is provided at a position from an image transfer station (primary transfer position) to the secondary transfer position by the image forming station in the moving direction a of the intermediate transfer belt 21. The toner adhesion amount sensor 24 outputs the detected toner adhesion amount to the system controller 5.

As shown in FIG. 1, the transfer belt cleaner 25 is disposed at a position from the secondary transfer position to the primary transfer position in the moving direction a of the intermediate transfer belt 21. The transfer belt cleaner 25 removes the toner on the intermediate transfer belt 21. For example, the transfer belt cleaner 25 removes the toner remaining on the transfer surface of the intermediate transfer belt 21 after the image is transferred from the intermediate transfer belt 21 to the recording medium.

The fixing device 26 fixes, onto the recording medium, the image formed with the toner transferred to the recording medium. The fixing device 26 is disposed in the conveyance path of the recording medium after passing through the secondary transfer position. The fixing device 26 includes a pressure roller and a heating roller facing each other. The fixing device 26 provides heat and pressure to the recording medium by conveying the recording medium between the pressure roller and the heating roller facing each other. The fixing device 26 fixes the toner image transferred to the recording medium by heating in a pressurized state.

Next, the corresponding configuration of the image forming stations SY, SM, SC, and SK in the digital multifunctional peripheral 1 as the image forming device according to the embodiment will be described in detail.

Figure 2:
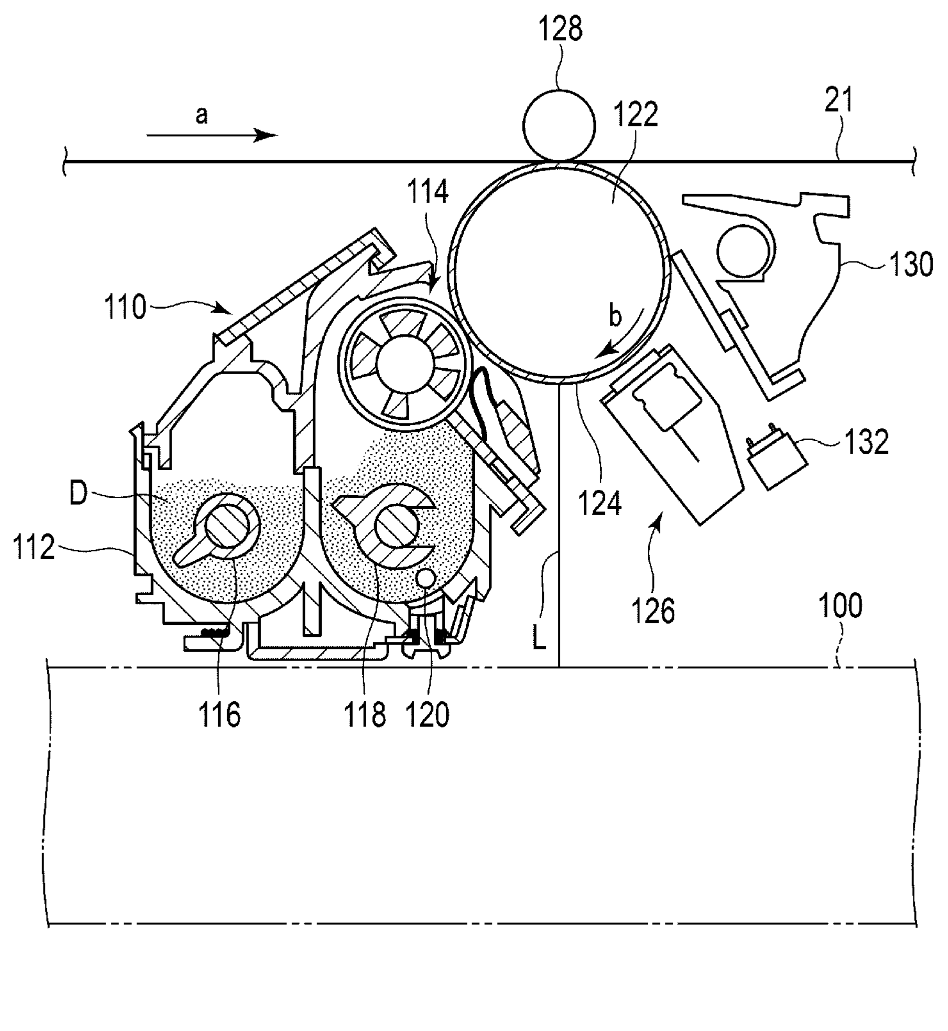
FIG. 2 is a diagram showing a configuration example of a printer.

FIG. 2 is a diagram showing the corresponding configuration example of the image forming stations SY, SM, SC, and SK in the printer 2.

As shown in FIG. 2, the image forming stations SY, SM, SC, and SK separately include an exposure device 100, a developer 110, a photoconductor drum 122, a charger 126, a primary transfer roller 128, a photoconductor cleaner 130, and a charge remover 132. In the present embodiment, the image forming stations SY, SM, SC, and SK separately include a configuration as shown in FIG. 2.

The photoconductor drum 122 is an image carrier including a photoconductor layer 124 on the surface thereof. The photoconductor drum 122 rotates in a direction (direction indicated by an arrow b in FIG. 2) according to a movement of the intermediate transfer belt 21 in the moving direction a. The charger 126, the exposure device 100, the developer 110, the primary transfer roller 128, the intermediate transfer belt 21, the photoconductor cleaner 130, and the charge remover 132 are disposed around the photoconductor drum 122.

The charger 126 uniformly charges the photoconductor layer 124 on the surface of the photoconductor drum 122. For example, the charger 126 uniformly negatively charges the photoconductor layer 124 on the surface of the photoconductor drum 122.

The exposure device 100 forms an electrostatic pattern (electrostatic latent image) corresponding to an image on the surface of the photoconductor drum 122. The exposure device 100 irradiates the surface of the photoconductor drum 122 with light L whose emission is controlled based on image data. For example, the exposure device 100 irradiates, by an optical system such as a polygon mirror, the surface of the photoconductor drum 122 with the light L emitted based on the image data. The exposure device 100 may be configured to include a device that emits a plurality of laser beams guided to the corresponding photoconductor drum 122 of the plurality of image forming stations. Further, the exposure device 100 may be a light emitting device provided for every one of the plurality of image forming stations.

The developer 110 develops, with a developer, the electrostatic latent image formed on the surface of the photoconductor drum 122. The developer 110 supplies a developer D to the surface of the photoconductor drum 122 exposed by the exposure device 100. The corresponding developer 110 of the image forming stations develops an image in a corresponding color. For example, the developer 110 of the image forming station SY develops an electrostatic latent image on the photoconductor drum 122 with a yellow toner. The developer 110 of the image forming station SM develops an electrostatic latent image on the photoconductor drum 122 with a magenta toner. The developer 110 of the image forming station SC develops an electrostatic latent image on the photoconductor drum 122 with a cyan toner. The developer 110 of the image forming station SK develops an electrostatic latent image on the photoconductor drum 122 with a black toner.

In the configuration example shown in FIG. 2, the developer 110 includes a developer container 112, a developing roller 114, a first mixer 116, a second mixer 118, and a toner density sensor 120.

The developer container 112 is a container that contains the developer D. The developer D is a mixture of a toner and a carrier made of magnetic fine particles. When the developer D is stirred, the toner is frictionally charged. Accordingly, the toner adheres to a surface of the carrier by electrostatic force.

The developing roller 114, the first mixer 116, the second mixer 118, and the toner density sensor 120 are disposed inside the developer container 112.

The toner density sensor 120 is disposed inside the developer container 112. The toner density sensor 120 detects a toner density in the developer D contained in the developer container 112. The toner density is represented by, for example, a ratio (toner/carrier) of the toner to the carrier in the developer D in the developer container 112. The system controller 5 controls the toner density detected by the toner density sensor 120 to be a predetermined value.

The developing roller 114 includes, for example, a magnetic body (for example, a magnet) in which a positive electrode and a negative electrode are alternately arranged circumferentially. The developing roller 114 rotates counterclockwise. The first mixer 116 and the second mixer 118 stir the developer D in the developer container 112. Further, the first mixer 116 and the second mixer 118 convey the developer D. The second mixer 118 disposed below the developing roller 114 supplies the developer D to a surface of the developing roller 114.

The developer D adheres to the surface of the developing roller 114 in a napped state according to a magnetic field distribution generated by the magnetic body of the developing roller 114. The developing roller 114 rotates while carrying the developer D. A layer of the developer D adhering to the developing roller 114 is limited to a predetermined thickness by a blade provided such that a distance from the surface of the developing roller 114 is a predetermined width. The developer D carried by the developing roller 114 limited to the predetermined thickness by the blade moves to a position (development position) facing the surface of the photoconductor drum 122.

A development bias is applied to the developing roller 114 carrying the developer D. A potential of the surface of the developing roller 114 is controlled by the development bias. The toner in the developer D carried by the developing roller 114 adheres to the electrostatic latent image due to a potential difference between the potential of the surface of the developing roller 114 and a potential of the electrostatic latent image formed on the surface of the photoconductor drum 122. As the developing roller 114 rotates in a predetermined direction, the developer D carried by the developing roller 114 approaches the surface of the photoconductor drum 122 on which the electrostatic latent image is formed. The toner contained in the developer D carried by the developing roller 114 develops the electrostatic latent image on the photoconductor drum 122 when the toner approaches the surface of the photoconductor drum 122. Accordingly, a toner image obtained by developing the electrostatic latent image with the toner is formed on the photoconductor drum 122.

Here, the potential difference between the potential of the surface of the developing roller 114 and the potential of the electrostatic latent image formed on the surface of the photoconductor drum 122 is referred to as a contrast voltage. The contrast voltage is in association with the density of the toner moving from the developing roller 114 to the electrostatic latent image on the photoconductor drum 122. That is, the density of the toner image formed on the photoconductor drum 122 is adjusted by controlling the contrast voltage. The contrast voltage is adjusted by controlling the development bias. Further, the contrast voltage may be adjusted by controlling the potential of the electrostatic latent image.

The image (toner image) developed with the toner on the surface of the photoconductor drum 122 is moved to a position corresponding to the primary transfer roller 128 by the rotation of the photoconductor drum 122. The primary transfer roller 128 faces the photoconductor drum 122 with the intermediate transfer belt 21 interposed therebetween. The primary transfer roller 128 abuts on the surface of the photoconductor drum 122 with the intermediate transfer belt 21 interposed therebetween. The primary transfer roller 128 transfers, to the intermediate transfer belt 21, the toner image on the surface of the photoconductor drum 122 (primary transfer).

The photoconductor cleaner 130 is disposed downstream of a position where the toner image on the surface of the photoconductor drum 122 is transferred to the intermediate transfer belt 21 in a circumferential direction of the photoconductor drum 122. The photoconductor cleaner 130 removes the toner on the surface of the photoconductor drum 122. That is, the photoconductor cleaner 130 removes the toner remaining on the surface of the photoconductor drum 122 after the primary transfer of the toner image from the photoconductor drum 122 to the intermediate transfer belt 21 is performed.

The charge remover 132 is disposed downstream of a position of the photoconductor cleaner 130 in the circumferential direction of the photoconductor drum 122. The charge remover 132 irradiates the surface of the photoconductor drum 122 with light. Accordingly, the charge remover 132 removes a charge remaining in the photoconductor layer 124 on the surface of the photoconductor drum 122.

Next, a configuration of a control system in the digital multi-functional peripheral 1 as the image forming device according to the embodiment will be described.

Figure 3:
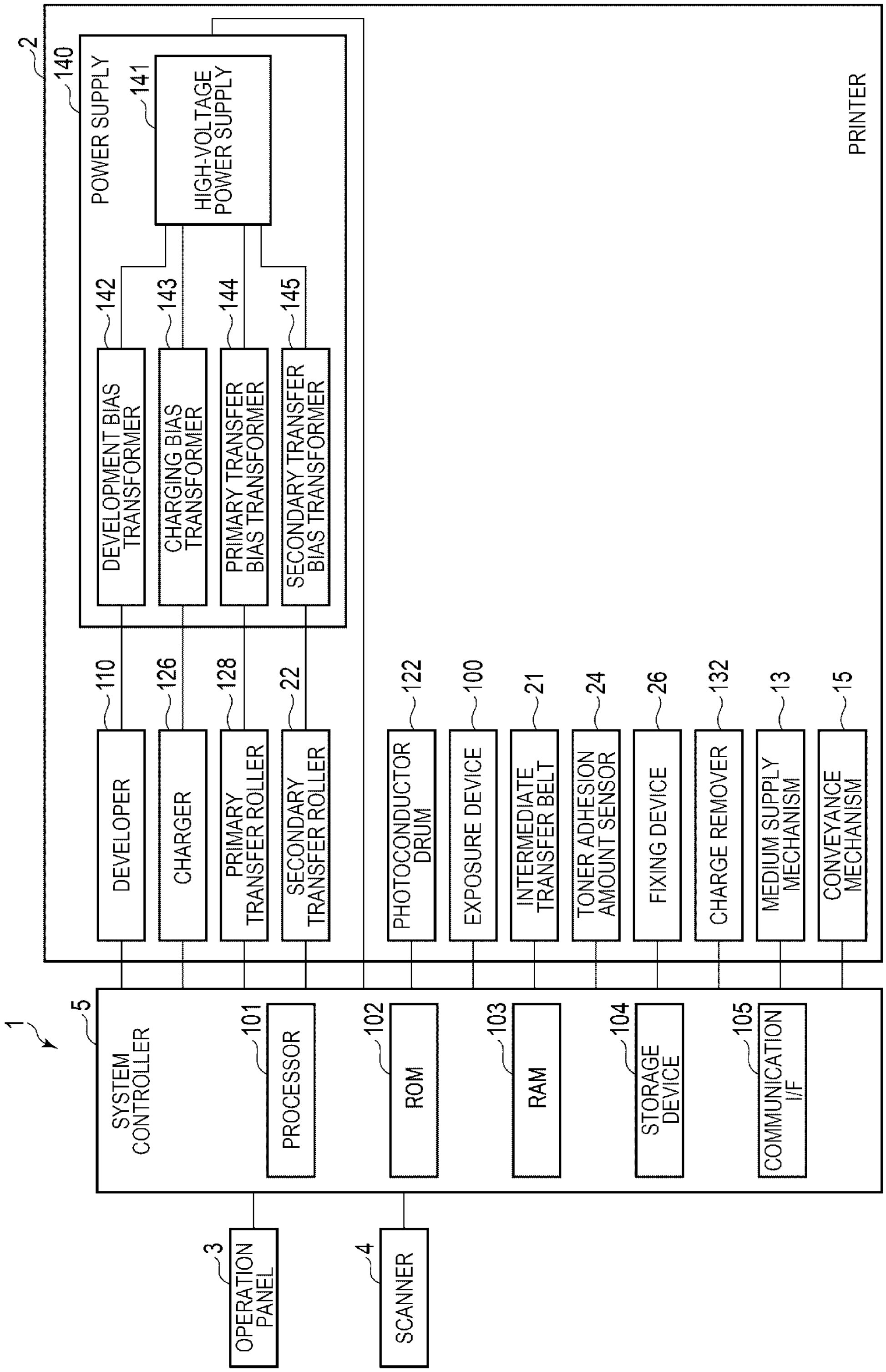
FIG. 3 is a block diagram showing a configuration example of a control system.

FIG. 3 is a block diagram showing a configuration example of the control system in the digital multi-functional peripheral 1 as the image forming device according to the embodiment.

As shown in FIG. 3, the system controller 5 includes a processor 101, a ROM 102, a RAM 103, a storage device 104, and a communication interface (I/F) 105. Further, the processor 101 of the system controller 5 is connected to the units in the digital multi-functional peripheral 1 via various interfaces.

The processor 101 executes various processes by executing a program. The processor 101 is, for example, a CPU. The processor 101 is connected to the ROM 102, the RAM 103, the storage device 104, and the communication interface (I/F) 105. Further, the processor 101 is connected to the units in the printer 2, the operation panel 3, and the scanner 4 via interfaces.

The ROM 102 is a non-volatile memory that is not rewritable. The ROM 102 operates as a program memory for storing a program. The RAM 103 operates as a working memory or a buffer memory. The processor 101 executes various processes by executing a program stored in the ROM 102 or the storage device 104 by using the RAM 103.

The storage device 104 is a non-volatile memory that is rewritable. For example, the storage device 104 includes a storage device such as a hard disk drive (HDD) or a solid state drive (SSD). The storage device 104 stores data such as control data, a control program, and setting information. The storage device 104 also stores image data.

The communication I/F 105 is an interface for performing data communication with the external device. For example, the communication I/F 105 communicates with a user terminal such as a PC and a mobile terminal via a network. The communication I/F 105 may input an image print request (print job) from the user terminal such as a PC.

As shown in FIG. 3, the printer 2 includes a power supply 140 in addition to the configurations shown in FIGS. 1 and 2.

The power supply 140 separately supplies a voltage to the developer 110, the charger 126, the primary transfer roller 128, and the secondary transfer roller 22. As shown in FIG. 3, the power supply 140 includes a high-voltage power supply 141, a development bias transformer 142, a charging bias transformer 143, a primary transfer bias transformer 144, and a secondary transfer bias transformer 145. The development bias transformer 142, the charging bias transformer 143, and the primary transfer bias transformer 144 are provided for every one of the image forming stations SY, SM, SC, and SK.

The high-voltage power supply 141 supplies a high voltage to the various transformers 142, 143, 144, and 145. The high voltage is, for example, a voltage of several hundreds of V to several kV. The high-voltage power supply 141 generates the high voltage from an input voltage of several tens of V, for example.

The development bias transformer 142 supplies a development bias voltage to the developer 110. The development bias transformer 142 converts the high voltage generated by the high-voltage power supply 141 into a development bias voltage having a voltage value set by the system controller 5. The development bias transformer 142 supplies, to the developer 110, the development bias voltage specified by the system controller 5.

The charging bias transformer 143 supplies a charging bias voltage to the charger 126. The charging bias transformer 143 converts the high voltage generated by the high-voltage power supply 141 into a charging bias voltage having a voltage value set by the system controller 5. The charging bias transformer 143 supplies, to the charger 126, the charging bias voltage specified by the system controller 5.

The primary transfer bias transformer 144 supplies a primary transfer bias voltage to the primary transfer roller 128. The primary transfer bias transformer 144 converts the high voltage generated by the high-voltage power supply 141 into a primary transfer bias voltage having a voltage value set by the system controller 5. The primary transfer bias transformer 144 supplies, to the primary transfer roller 128, the primary transfer bias voltage specified by the system controller 5.

The secondary transfer bias transformer 145 supplies a secondary transfer bias voltage to the secondary transfer roller 22. The secondary transfer bias transformer 145 converts the high voltage generated by the high-voltage power supply 141 into a secondary transfer bias voltage having a voltage value set by the system controller 5. The secondary transfer bias transformer 145 supplies, to the secondary transfer roller 22, the secondary transfer bias voltage having a value specified by the system controller 5.

Next, an operation of forming an image in the digital multi-functional peripheral 1 as the image forming device according to the embodiment will be described.

The digital multi-functional peripheral 1 forms an image by acquiring an image to be formed on the recording medium M, and printing the acquired image on the recording medium M by the printer 2. For example, when a copying instruction is given from the operation panel 3, the processor 101 of the system controller 5 prints, on the recording medium M by the printer 2, the image of the document read by the scanner 4.

When the image is to be formed, the processor 101 of the system controller 5 takes in, by the medium supply mechanism 13, the recording medium M stored in a storage unit. The processor 101 conveys, by the conveyance mechanism 15, the recording medium M supplied from the medium supply mechanism 13, to a position in front of the registration roller 56 in the printer 2.

Further, the processor 101 of the system controller 5 generates the corresponding image formed by the image forming stations SY, SM, SC, and SK based on an image (printed image) to be printed on the recording medium M. For example, the processor 101 generates images of colors (yellow, magenta, cyan, and black) formed by the image forming stations SY, SM, SC, and SK based on the printed image. When the processor 101 generates the images of the colors based on the printed image, the processor 101 causes the image forming stations to form the generated images of the colors.

In the image forming stations SY, SM, SC, and SK, the charger 126 receives the charging bias voltage from the charging bias transformer 143 to charge the photoconductor layer 124 of the photoconductor drum 122. The exposure device 100 irradiates the corresponding photoconductor drum 122 of the image forming stations SY, SM, SC, and SK with light that forms an electrostatic latent image corresponding to an image of a color. In the image forming stations SY, SM, SC, and SK, the electrostatic latent image is formed on the photoconductor layer 124 of the photoconductor drum 122 by the light emitted from the exposure device 100.

The image forming stations SY, SM, SC, and SK separately develop the electrostatic latent image on the photoconductor drum 122 with a toner of a color contained in the developer 110. In the image forming stations SY, SM, SC, and SK, the developing roller 114 rotates while carrying a developer containing a toner of a color supplied from the developer container 112. A development bias voltage from the development bias transformer 142 is applied to the developing roller 114 that carries the developer. The developer 110 supplies, to the electrostatic latent image, the toner in the developer carried by the developing roller 114, by the potential difference (contrast potential) between the potential on the developing roller 114 and the electrostatic latent image on the photoconductor drum 122.

In the image forming stations SY, SM, SC, and SK, the photoconductor drum 122 moves the image (toner image) developed by the developer 110 to a position (primary transfer position) facing the primary transfer roller 128. At the primary transfer position, the photoconductor drum 122 faces the primary transfer roller 128 with the intermediate transfer belt 21 interposed therebetween. The primary transfer bias voltage from the primary transfer bias transformer 144 is applied to the primary transfer roller 128. The toner image on the photoconductor drum 122 is transferred to the intermediate transfer belt 21 by the primary transfer roller 128 to which the primary transfer bias voltage is applied at the primary transfer position. When a color image is to be formed, the image forming stations SY, SM, SC, and SK superimpose and transfer the toner images of the colors on the intermediate transfer belt 21. Accordingly, the color image in which the toner images of the colors are superimposed is transferred to the intermediate transfer belt 21.

The intermediate transfer belt 21 moves the transferred toner image to a position (secondary transfer position) facing the secondary transfer roller 22. The registration roller 56 feeds the recording medium M to the secondary transfer position according to the timing and the position of the image transferred to the intermediate transfer belt 21. Accordingly, the recording medium M is conveyed in a state where the overlapping intermediate transfer belt 21 and recording medium M are sandwiched between the secondary transfer roller 22 and the support roller 23 at the secondary transfer position. The secondary transfer bias voltage from the secondary transfer bias transformer 145 is applied to the secondary transfer roller 22. The toner image on the intermediate transfer belt 21 is transferred to the recording medium M at the secondary transfer position by the secondary transfer roller 22 to which the secondary transfer bias voltage is applied.

The recording medium M passing through the secondary transfer position is conveyed to the fixing device 26. The fixing device 26 fixes, onto the recording medium M, the toner image transferred from the intermediate transfer belt 21 to the recording medium M at the secondary transfer position. The fixing device 26 applies heat and pressure to the recording medium M, on which the toner image is transferred, to fix the toner image onto the recording medium M. The recording medium M passing through the fixing device 26 is discharged from the paper discharge unit with the toner image fixed thereon.

Next, image density adjustment in the digital multi-functional peripheral 1 as the image forming device according to the embodiment will be described.

The printer 2 of the digital multi-functional peripheral 1 adjusts a density of the image formed on the recording medium M by the image formation as described above. The density of the image formed on the recording medium M varies depending on an amount (density) of the toner supplied from the developing roller 114 to the electrostatic latent image when the electrostatic latent image on the photoconductor drum 122 is developed.

The density of the toner supplied from the developing roller 114 to the electrostatic latent image is adjusted by the contrast potential, which is the potential difference between the electrostatic latent image on the photoconductor drum 122 and the developing roller 114. The processor 101 of the system controller 5 executes image density adjustment of adjusting the density of the image of a color formed on the recording medium M by controlling the contrast potential for a color. The image density adjustment may be performed periodically or at any timing.

The processor 101 of the system controller 5 in the digital multi-functional peripheral 1 according to the present embodiment detects differences in contrast potential of the colors after executing the image density adjustment. The processor 101 notifies a warning when there is a contrast potential whose difference from another contrast potential exceeds a reference value.

Figure 4:
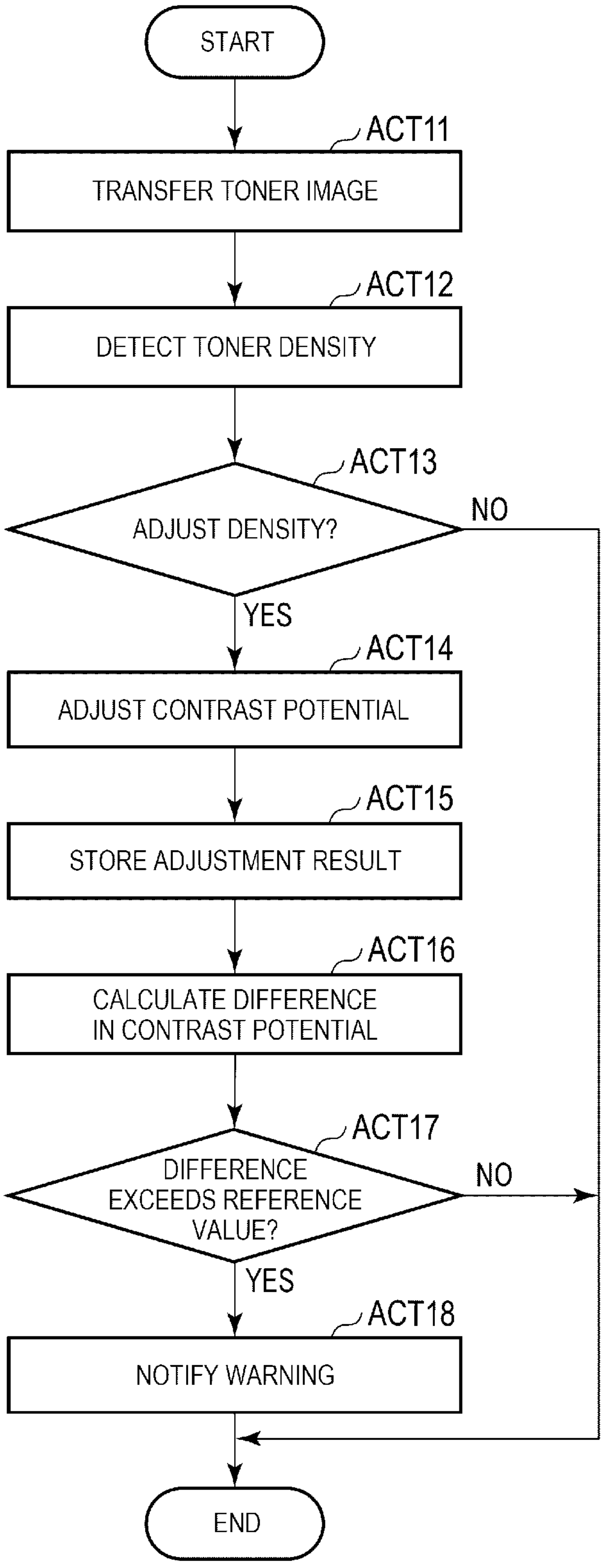
FIG. 4 is a flowchart illustrating an operation example of image density adjustment.

FIG. 4 illustrates an operation example of the image density adjustment in the digital multi-functional peripheral 1 as the image forming device according to the embodiment.

The processor 101 of the system controller 5 executes the image density adjustment to uniformize the toner density of the image of a corresponding color formed by the image forming stations SY, SM, SC, and SK. The processor 101 transfers, to the intermediate transfer belt 21, the corresponding toner image formed by the image forming stations SY, SM, SC, and SK as the image density adjustment (ACT 11).

The corresponding toner image formed by the image forming stations SY, SM, SC, and SK in the image density adjustment may be an image having a predetermined test pattern or any image. The toner image of a corresponding color formed by the image forming stations SY, SM, SC, and SK is transferred to the intermediate transfer belt 21 at the respective primary transfer positions.

The processor 101 of the system controller 5 detects the toner density of a color by the toner adhesion amount sensor 24 after transferring the toner image of a corresponding color to the intermediate transfer belt 21 (ACT 12). The toner adhesion amount sensor 24 detects the density (toner density) of the toner image of a color transferred to the intermediate transfer belt 21. The toner adhesion amount sensor 24 supplies, to the processor 101, a detection result indicating the toner density of a color.

The processor 101 determines whether to adjust the density for every image forming station based on the toner density of a color detected by the toner adhesion amount sensor 24 (ACT 13). For example, the processor 101 determines whether the toner density of a color detected by the toner adhesion amount sensor 24 is a predetermined density (within a predetermined density range). The processor 101 determines that the density is to be adjusted for the image forming station of the color determined to have a toner density that is not the predetermined density.

When there is an image forming station that is determined to be adjusted in density (YES in ACT 13), the processor 101 adjusts the contrast potential of the image forming station to be adjusted in density (ACT 14). For example, when the density of the yellow (magenta, cyan, black) toner is not the predetermined density, the processor 101 adjusts the contrast potential in the image forming station SY (SM, SC, SK).

In the density adjustment, the processor 101 changes (adjusts) the contrast potential such that the toner density of the toner image formed by the image forming station is the predetermined density. For example, the processor 101 changes the contrast potential by controlling the development bias voltage applied to the developing roller 114 by the development bias transformer 142. Further, the system controller 5 may change the contrast potential by controlling the charging bias voltage applied to the charger 126 by the charging bias transformer 143. Furthermore, the system controller 5 may change the contrast potential by controlling the light emitted to the photoconductor drum 122 by the exposure device 100.

When the image density adjustment is executed, the processor 101 stores, in the storage device 104, an adjustment result of the corresponding contrast potential in the image forming stations SY, SM, SC, and SK (ACT 15). For example, when the contrast potential in the image forming station SY is adjusted, the processor 101 stores, in the storage device 104, an adjustment result of a contrast potential of the yellow color (contrast potential corresponding to the image forming station SY). Similarly, when the contrast potential in the image forming station SM (SC, SK) is adjusted, the processor 101 stores, in the storage device 104, an adjustment result of a contrast potential of the magenta (cyan, black) color.

Further, when the contrast potential is adjusted, the processor 101 calculates a difference in contrast potential among the image forming stations SY, SM, SC, and SK (ACT 16). The processor 101 calculates a difference between the contrast potential of a color (contrast potential corresponding to an image forming station) and a contrast potential of another color (contrast potential corresponding to another image forming station).

When the differences in contrast potential of the colors are calculated, the processor 101 determines whether there is a contrast potential whose difference from the contrast potential of another color exceeds the reference value (ACT 17). The reference value to be compared with a difference in contrast potential is a threshold value for determining that there is a possibility that a malfunction such as a failure or an abnormality occurs in the digital multi-functional peripheral 1. An image forming station including a device having a failure or an abnormality may have a large difference in contrast potential as compared with a contrast potential of another image forming station.

For example, in a developer having an abnormality in a toner density sensor, a toner density in the developer cannot be maintained at a predetermined value. In an image forming station where the toner density in the developer is not maintained at the predetermined value, the contrast potential is significantly changed in order to adjust the toner density to the predetermined value. A contrast potential of an image forming station including the developer having the abnormality in the toner density sensor may have a large difference from the contrast potential of another image forming station. Further, a contrast potential of an image forming station in which a charger, an exposure device or a developing roller is not operating in a normal state may have a large difference from another contrast potential.

When there is no contrast potential whose difference from another contrast potential exceeds the reference value (NO in ACT 17), the processor 101 ends the image density adjustment. That is, when the difference in contrast potential of the colors is within the reference value, the processor 101 ends the series of operations in the image density adjustment.

When the difference in contrast potential exceeds the reference value (YES in ACT 17), the processor 101 notifies a warning that the difference in contrast potential exceeds the reference value (ACT 18). The warning to be notified may prompt verification or maintenance of a malfunction suggested by the difference in contrast potential exceeding the reference value. For example, the warning may be an inspection or maintenance guide, or may be a message notifying that there is a possibility of a failure or an abnormality in the digital multi-functional peripheral. Further, the warning may include a message indicating an image forming station or a color whose difference in contrast potential from another contrast potential exceeds the reference value.

In addition, even when the difference in contrast potential exceeds the reference value, the digital multi-functional peripheral 1 can form an image having a normal density as long as the toner density of a color is adjusted to a normal value. Therefore, the processor 101 may continue the operation of the image formation even when the warning indicating that the difference in contrast potential exceeds the reference value is notified. Accordingly, the digital multi-functional peripheral 1 can maintain the image formation at a normal density and notify a warning that the difference in contrast potential is increased.

Further, the processor 101 may notify, without notifying the user, a service person or an administrator that the difference in contrast potential exceeds the reference value. Accordingly, the digital multi-functional peripheral 1 can provide the user with normal image formation and prompt the service person to perform maintenance for the abnormality suggested by the difference in contrast potential.

For example, the processor 101 notifies a terminal device (external device) possessed by the service person via the communication I/F 105 that the difference in contrast potential exceeds the reference value. Further, the processor 101 may notify a system managing an operating state of the digital multi-functional peripheral via the communication I/F 105 that the difference in contrast potential exceeds the reference value. Furthermore, the processor 101 may display on the operation panel 3 that the difference in contrast potential exceeds the reference value when the service person or the administrator logs in.

It should be noted that the processor 101 may execute the ACTS 11 to 15 as the image density adjustment, and may execute the ACTS 16 to 18 in response to a request from the service person. Accordingly, the digital multi-functional peripheral 1 can notify a possibility of a failure or an abnormality based on the differences in contrast potential of the colors in response to the request from the service person.

As described above, an image forming device according to the embodiment includes a plurality of photoconductor drums, a plurality of developing rollers, and a system controller. A photoconductor drum carries an electrostatic latent image formed by light from an exposure device. A developing roller is provided facing a photoconductor drum. A developing roller supplies a toner to the electrostatic latent image by a contrast potential which is a potential difference from the electrostatic latent image carried by the facing photoconductor drum. The system controller adjusts a contrast potential corresponding to a photoconductor drum such that a density of a toner image developed on a photoconductor drum is uniform. The system controller notifies a warning when a difference in contrast potential corresponding to a photoconductor drum exceeds a reference value.

With the above-described configuration, when image density is to be adjusted, the image forming device according to the embodiment can notify that a difference in contrast potential, which may be a failure or an abnormality, occurs. As a result, according to the image forming device of the embodiment, the service person can predict a portion where there is a possibility of a failure or an abnormality based on the difference in contrast potential. In addition, the image forming device can be facilitated, by notifying that the difference in contrast potential exceeds the reference value, rapid maintenance for a portion where a failure or an abnormality may occur.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system controller for communicating with an image forming device, including:

a plurality of photoconductors, an exposure device configured to irradiate a corresponding surface of the plurality of photoconductors with light corresponding to an image formed on a corresponding photoconductor of the plurality of photoconductors, a developer configured to supply a toner to the corresponding surface of the plurality of photoconductors on which an electrostatic latent image is formed by the light emitted by the exposure device, and a processor configured to adjust, for each photoconductor, a contrast potential for supplying the toner from the developer to the electrostatic latent image formed on the corresponding surface of the plurality of photoconductors, the system controller comprising:

the processor configured to generate a warning when a contrast potential of at least one of the plurality of photoconductors differs from a contrast potential of another of the plurality of photoconductors greater than a reference value; and a communication interface configured to transmit the warning to a terminal device.

2. The system controller according to claim 1, wherein the developer includes a plurality of developing rollers facing the photoconductors, and the processor adjusts the contrast potential for the photoconductor by adjusting a voltage applied to the plurality of developing rollers.

3. The system controller according to claim 1, further comprising:

a sensor configured to detect a toner density in a medium to which a toner image formed on the corresponding surface of the plurality of photoconductors by the toner supplied from the developer is transferred, wherein the processor adjusts the contrast potential corresponding to the photoconductor such that the toner density detected by the sensor is a desired density, and calculates a difference in contrast potential after adjustment of contrast potentials corresponding to each of the photoconductors is completed.

4. The system controller according to claim 1, wherein the processor notifies the terminal device of the warning via the communication interface when the contrast potential differs from the another contrast potential greater than the reference value.

5. The system controller according to claim 4, further comprising:

a memory configured to store an adjustment result of the contrast potential for the photoconductor, wherein when the contrast potential differs from the another contrast potential greater than the reference value, the processor displays, on a display device, a warning indicating that there is the contrast potential that differs from another contrast potential greater than the reference value.

6. The system controller according to claim 1, wherein the processor is further configured to maintain, for each photoconductor, the contrast potential for supplying the toner from the developer to the electrostatic latent image formed on the corresponding surface of the plurality of photoconductors, and not notify a warning when the contrast potential differs from another contrast potential less than the reference value.

7. The system controller according to claim 1, wherein the plurality of photoconductors comprise a first photoconductor for forming a yellow image, a second photoconductor for forming a magenta image, a third photoconductor for forming a cyan image, and a fourth photoconductor for forming a black image.

8. An image forming method, comprising:

irradiating a corresponding surface of a plurality of photoconductors with light corresponding to an image formed on a corresponding photoconductor of the plurality of photoconductors;

supplying a toner to the corresponding surface of the plurality of photoconductors on which an electrostatic latent image is formed by the light emitted;

adjusting, for each photoconductor, a contrast potential for supplying the toner to the electrostatic latent image formed on the corresponding surface of the plurality of photoconductors;

generating a warning when a contrast potential of at least one of the plurality of photoconductors differs from a contrast potential of another of the plurality of photoconductors greater than a reference value; and transmitting the warning to a terminal device.

9. The image forming method according to claim 8, further comprising:

adjusting the contrast potential for the photoconductor by adjusting a voltage applied to a plurality of developing rollers facing the photoconductors.

10. The image forming method according to claim 8, further comprising:

detecting a toner density in a medium to which a toner image formed on the corresponding surface of the plurality of photoconductors by the toner supplied is transferred;

adjusting the contrast potential corresponding to the photoconductor such that the toner density detected is a desired density; and calculating a difference in contrast potential after adjustment of contrast potentials corresponding to each of the photoconductors is completed.

11. The image forming method according to claim 8, further comprising:

communicating with an image forming device; and notifying the image forming device of the warning when the contrast potential differs from the another contrast potential greater than the reference value.

12. The image forming method according to claim 11, further comprising:

storing an adjustment result of the contrast potential for the photoconductor; and when the contrast potential differs from the another contrast potential greater than the reference value, displaying a warning indicating that there is the contrast potential that differs from another contrast potential greater than the reference value.

13. The image forming method according to claim 8, further comprising:

maintaining, for each photoconductor, the contrast potential for supplying the toner from the developer to the electrostatic latent image formed on the corresponding surface of the plurality of photoconductors; and not notifying a warning when the contrast potential differs from another contrast potential less than the reference value.

14. A server, comprising:

a processor configured to generate a warning when a contrast potential of at least one of a plurality of photoconductors differs from a contrast potential of another of the plurality of photoconductors greater than a reference value; and a communication interface configured to transmit the warning to an image forming device, wherein the image forming device comprises:

an exposure device configured to irradiate a corresponding surface of a plurality of photoconductors with light corresponding to an image formed on a corresponding photoconductor of the plurality of photoconductors;

a developer configured to supply a toner to the corresponding surface of the plurality of photoconductors on which an electrostatic latent image is formed by the light emitted by the exposure device; and a subprocessor configured to adjust, for each photoconductor, a contrast potential for supplying the toner from the developer to the electrostatic latent image formed on the corresponding surface of the plurality of photoconductors, and notify a warning when a contrast potential differs from another contrast potential greater than a reference value.

15. The server according to claim 14, wherein the developer includes a plurality of developing rollers facing the photoconductors, and the processor adjusts the contrast potential for the photoconductor by adjusting a voltage applied to the plurality of developing rollers.

16. The server according to claim 14, further comprising:

a sensor configured to detect a toner density in a medium to which a toner image formed on the corresponding surface of the plurality of photoconductors by the toner supplied from the developer is transferred, wherein the processor adjusts the contrast potential corresponding to the photoconductor such that the toner density detected by the sensor is a desired density, and calculates a difference in contrast potential after adjustment of contrast potentials corresponding to each of the photoconductors is completed.

17. The server according to claim 14, wherein the processor notifies the image forming device of the warning via the communication interface when the contrast potential differs from the another contrast potential greater than the reference value.

18. The server according to claim 17, further comprising:

a memory configured to store an adjustment result of the contrast potential for the photoconductor, wherein when the contrast potential differs from the another contrast potential greater than the reference value, the processor displays, on a display device, a warning indicating that there is the contrast potential that differs from another contrast potential greater than the reference value.

19. The server according to claim 14, wherein the processor is further configured to maintain, for each photoconductor, the contrast potential for supplying the toner from the developer to the electrostatic latent image formed on the corresponding surface of the plurality of photoconductors, and not notify a warning when the contrast potential differs from another contrast potential less than the reference value.

20. The server according to claim 14, wherein the plurality of photoconductors comprise a first photoconductor for forming a yellow image, a second photoconductor for forming a magenta image, a third photoconductor for forming a cyan image, and a fourth photoconductor for forming a black image.

* * * * *